United States Patent
Pedersen

(10) Patent No.: US 11,716,999 B2
(45) Date of Patent: Aug. 8, 2023

(54) SYSTEM AND PROCESS FOR PICKING UP AND TRANSPORTING A CASING

(71) Applicant: Proxima Centauri ApS, Odense NV (DK)

(72) Inventor: Jan Pedersen, Odense NV (DK)

(73) Assignee: Proxima Centauri ApS, Odense SV (DK)

( * ) Notice: Subject to any disclaimer, the term of this patent is extended or adjusted under 35 U.S.C. 154(b) by 216 days.

(21) Appl. No.: 17/349,036

(22) Filed: Jun. 16, 2021

(65) Prior Publication Data

US 2021/0307341 A1 Oct. 7, 2021

Related U.S. Application Data

(63) Continuation of application No. PCT/DK2019/050395, filed on Dec. 16, 2019.

(51) Int. Cl.
*A22C 13/00* (2006.01)

(52) U.S. Cl.
CPC .................................. *A22C 13/00* (2013.01)

(58) Field of Classification Search
CPC .............................. A22C 13/00; A22C 11/003
USPC ........................................ 452/30–32, 46–48
See application file for complete search history.

(56) References Cited

U.S. PATENT DOCUMENTS

| 2,187,790 | A | 1/1940 | Leavenworth | |
|---|---|---|---|---|
| 3,337,906 | A | 8/1967 | Ludwig | |
| 5,217,404 | A | 6/1993 | Lanfrey | |
| 7,549,915 | B2 * | 6/2009 | Duringer | A22C 11/125 452/49 |
| 8,556,687 | B2 * | 10/2013 | Meyrahn | A22C 15/001 452/51 |
| 8,708,782 | B2 * | 4/2014 | Kessler | A22C 15/001 452/51 |
| 2014/0025198 | A1 | 1/2014 | Mattern et al. | |

FOREIGN PATENT DOCUMENTS

| DE | 19619713 A1 | 11/1997 |
|---|---|---|
| GB | 657183 A | 9/1951 |
| GB | 784443 A | 10/1957 |
| WO | 2018115147 A1 | 6/2018 |

* cited by examiner

Primary Examiner — Richard T Price, Jr.
(74) Attorney, Agent, or Firm — Elevated IP, LLC

(57) ABSTRACT

There is provided a system and a process for picking up and transporting a casing of indefinite length into relationship with a device, such as a device for measuring the diameter of the casing. The process comprises the steps: i) placing the casing on a support; ii) directing an actuated arm equipped with a finger towards the casing; iii) moving the actuated arm away from the support and activating rollers to coil the casing onto the finger; and iv) moving the finger with the casing to a device, such as a device for measuring the diameter thereof, and decoiling the casing to transfer the casing to the device.

20 Claims, 16 Drawing Sheets

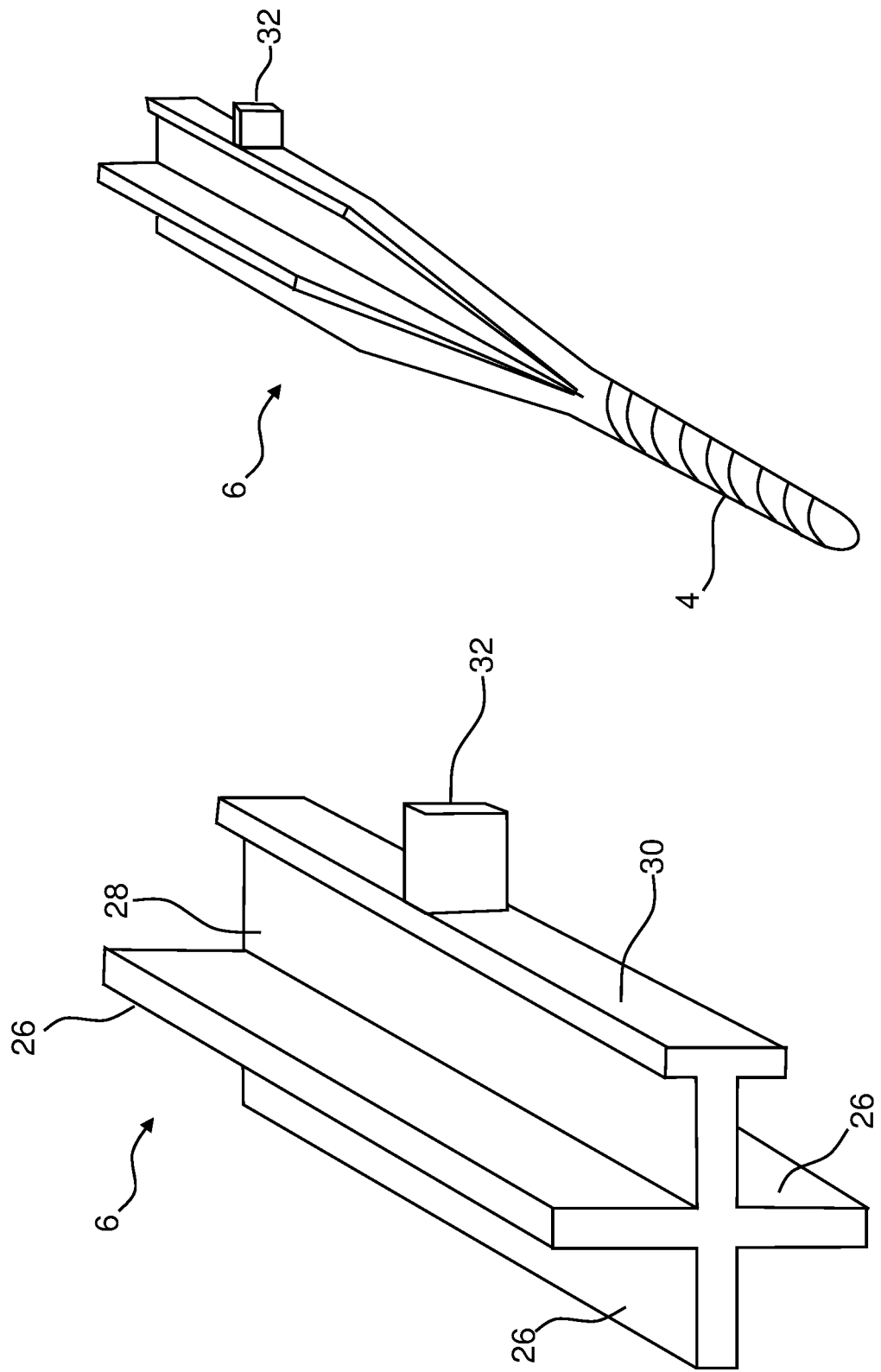

SYSTEM AND PROCESS FOR PICKING UP AND TRANSPORTING A CASING

CROSS-REFERENCE TO RELATED APPLICATIONS

This application is a continuation under 35 U.S.C. 111 of International Patent Application No. PCT/DK2019/050395, filed Dec. 16, 2019, which claims the benefit of and priority to Danish Application No. PA 2018 70828, filed Dec. 19, 2018, each of which is hereby incorporated by reference in its entirety.

FIELD OF INVENTION

The present invention relates to a system for the automated picking up and transporting of a casing of indefinite length into relationship with a device for further processing, such as for measuring the diameter or tubing of the casing.

BACKGROUND

In slaughterhouses, carcasses are examined and processed based on measurement of individual carcasses. To determine the quality and/or to cut the carcass into valuable parts of meat, the examination and processing devices are controlled relative to the location of anatomical parts of the carcass. Intestines from the animals are processed in a similar way, and e.g. natural casings are of major interest.

The first phase in the processing of a natural casing involves cleaning the casing immediately after the slaughtering of the animal, to avoid any risk of microbial growth and fermentation. The second phase involves carrying out the scraping of the inner wall of the casing, that is to say removing a so-called mucous layer from it, and the scraping of the outer part of the casing which has a protective membrane, in order to preserve only the muscular central part composed of two planes of smooth white fibres. The third phase involves carrying out the calibration of the casing as a function of its diameter. In fact, a casing varies in diameter and quality over its entire length, these two parameters themselves varying with the age, breed, feeding method and rearing system of the animals. The calibration operation is carried out, in a known way, by inflating the casing with water or air in order to measure its diameter. The fourth phase in the processing of the casing involves packaging the latter according to its size and quality, this packaging in predetermined lengths being carried out in the form of cured, dry or briny hanks or by folding on a support, such as a rigid tube or an elongate support of flexible synthetic material.

These four successive phases in the processing of the casing are carried out independently of one another and empirically, the quality of the end result being governed essentially by the experience of the particular operator.

GB 657183 A discloses an apparatus for feeding a collapsible tubular member onto a cylindrical core comprising a pair of relatively long and thin fingers which are spaced apart transversely of the fingers and which are substantially parallel and lie side by side and project from one end of the core. The apparatus comprises a pair of rollers between which the tubular member is adapted to be gripped and fed over the fingers onto the core, wherein the rollers are engaging the tubular member between the fingers to feed it over them and means for driving the rollers.

SUMMARY

The object of the present invention is to overcome intervention of an operator between the second and third phases by providing a method and a system for carrying out this step. Another object of the present invention is to reduce costs associated with this process by providing a method and system for automated handling of the casings. It is an object of the invention to provide an improved apparatus that is capable of picking up the casing from the support in an automatic and controlled manner.

A system according to the invention is a system for use in picking up and transporting a casing of indefinite length into relationship with a device, such as a device for measuring the diameter or tubing of the casing, said system comprising:
  a support for placing the casing to be picked up,
  a camera for detecting the casing when placed on the support,
wherein the system comprises:
  an actuated arm, such as a robot arm, equipped with a finger fitting the interior of the casing and
  a control unit receiving image information from the camera, wherein the control unit is configured to direct the finger to the casing when placed on the support, and subsequently move the finger with the casing to a device, such as a device for measuring the diameter thereof, and finally decoiling the casing to transfer the casing to such device.

Hereby, it is possible to provide a system for improved automated handling of casings.

In one embodiment, the system comprises a device for measuring the diameter or tubing of the casing.

In one embodiment, the support for placing the casing to be picked up comprises or is made of a flexible material.

In one embodiment, at least a portion of the support is made of a foam material.

The camera for detecting the casing when placed on the support may be of any suitable type. The camera may be connected to the control unit by either a wired or a wireless connection.

In one embodiment, the actuated arm is a robot arm.

The actuated arm is equipped with a finger fitting the interior of the casing. In one embodiment, the finger is rod-shaped.

The control unit is configured to receive image information from the camera. The image information may be one or more images. In one embodiment, the image information is a video sequence.

The control unit is configured to direct the finger to the casing when the casing is placed on the support. Accordingly, in a preferred embodiment the diameter or width of the finger is smaller than or equal to the width or diameter of the casing to be picked up (while the casing is placed on the support).

The control unit is configured to initiate that the finger is moved together with the casing to a device, such as a device for measuring the diameter thereof. By the term "to a device" is meant to a position, from which the device is capable of handling the casing, e.g. initiate and carry out a process with the purpose of measuring the diameter of the casing.

In one embodiment, the control unit is configured to activate one or more mechanisms configured to decoil the casing in order to allow the casing to be transferred to a device. The system preferably comprises a motor (e.g. an AC motor or a DC motor) arranged and configured to be activated by the control unit. In one embodiment, the motor is configured to rotate one or more rollers.

In one embodiment, the system comprises one or more actuatable rollers configured to be brought into engagement with the finger in order to coil the casing onto the finger (when the finger has engaged with the casing).

It may be an advantage that the control unit is configured to activate the one or more rollers to coil the casing onto the finger. This may be done by controlling (including turning on, turning off or regulating the speed of a motor arranged and configured to drive the one or more rollers.

In one embodiment, the system comprises two rollers configured to hold a portion of the casing by pressing the rollers against the outer face of a part of the casing mounted on the finger and held between the rollers.

It may be advantageous that the support has a surface configured to prevent the casing from sliding away from the support when the finger interacts with the casing. Furthermore, it may be beneficial that the support is made from a flexible material having a rough surface, preventing the casing from sliding away from the finger, and allowing the finger to move in between the two layers of the casing laying on the support. Hereby, the finger is allowed to displace an upper portion of the casing relative to a lower portion of the casing in order to let the finger enter the interior of the casing while the bottom portion of the casing remains in a fixed portion relative to the portion of the support at which portion the casing is placed (the casing may, however, be moved downwards together with the support if the support is resilient and is compressed due to the pressure provided towards it by the finger). By the term "rough surface" is meant any surface providing a coefficient of friction large enough (even when the casing is wet) to prevent the casing from sliding away from the finger, and allowing the finger to move in between the two layers of the casing laying on the support.

In one embodiment, the support is coated with a fabric. This may be advantageous because the coated fabric may have a desirable coefficient of friction.

It may be beneficial that the one or more rollers are provided in a separate device or mounted on the actuated arm so as to be movable onto the outer surface of the casing, when the finger has engaged with the casing, wherein the one or more rollers when activated are configured to ensure that the entire casing is coiled onto the finger.

Hereby, it is possible to provide a modular system comprising separate modules that can be replaced or serviced independently. Moreover, the system can be more user-friendly because the type of device can be selected by the user.

It may be an advantage that the support is dark so as to provide optimal background contrast relative to the casing.

In one embodiment, the support is made from or covered with a light reflecting material. Hereby, it is possible to provide highly useful image data.

It may be advantageous that the system comprises an infrared irradiating device configured to illuminate the support.

It may be beneficial that the one or more rollers are conical.

In one embodiment, the system comprises a receiving structure configured to be inserted into the interior of the casing hereby creating a plurality of spaces between the outside surface of the receiving structure and the inside of the casing, wherein the system comprise a plurality of moveably arranged engagement structures configured to be inserted into said spaces, wherein the engagement structures are configured to be moved in order to expand the casing hereby bringing the (inside surface of the) casing into contact with the engagement structures and removing the contact between the casing and one or more portions of the receiving structure so that the casing can be moved by moving the engagement structures.

In one embodiment, the engagement structures are configured to be moved perpendicular to the length of the receiving structure and hereby expand the casing.

In one embodiment, the engagement structures are configured to be moved along the length of the receiving structure when the casing is attached to the engagement structures. Hereby, it is possible to move the casing away from the receiving structure e.g. to place the casing on another machine structure (e.g. in order to measure the diameter of the casing).

In one embodiment, the system comprises intermediate structures (like the one illustrated in FIG. 2A and FIG. 2B) arranged in a position, in which they can be used to clamp against the outside surface of a casing received by a receiving structure. Hereby, it is possible to better control transportation of the casing (since the casing is clamped both from the inside by means of the engagement structures and from the outside by the intermediate structures).

A method according to the invention is a method for picking and transporting a casing of indefinite length into relationship with a device, such as a device for measuring the diameter of the casing, wherein the method comprises the steps:

placing the casing on a flexible support with a rough surface, wherein the process comprises the step of:

directing an actuated arm, such as a robot arm, equipped with a finger fitting the interior of the casing towards the casing, whereby the finger engages with the casing and moving the finger with the casing to a device, such as a device for measuring the diameter thereof.

Hereby, it is possible to provide an improved method for automated handling of casings.

It may be an advantage that the method comprises the step of activating one or more actuated rollers to coil the casing onto the finger. Hereby, it is possible to ensure that the entire casing is picked up.

It may be advantageous that the one or more rollers are provided in a separate device or mounted on the actuator so as to be movable onto the outer surface of the casing, when the finger has engaged with the casing, wherein the one or more rollers when activated are configured to ensure that the entire casing is coiled onto the finger.

The present invention provides solutions to ensure that a casing can be transported after it has been cleaned to a site, where its diameter can be measured.

The support may be coated with a fabric and may be made of a spongy material so as to allow the picking of the finger without the finger damaging the casing with holes. In an embodiment, the support is in a dark colour so as to give optimal background contrast relative to the casing. Alternatively, the support is made from or covered with a light reflecting material, which is suitable for being irradiated with an infrared irradiating device, which will also provide a good contrast between the casing and the support so as to enable the camera to localize the position of the casing.

The rollers may be provided in a separate device or mounted on the actuated arm so as to be movable onto the outer surface of the casing, when the finger is engaged with the casing, said rollers, when activated, ensuring that the entire casing is coiled onto the finger. Preferably, the rollers are conical in shape.

In another aspect the present invention provides a process for transporting a casing of indefinite length into relationship with a device for measuring the diameter of the casing, said process comprising the steps: i) placing the casing on the support; ii) directing an actuated arm, such as a robot arm, equipped with a finger towards the casing and thereby picking up a portion thereof; iii) activating rollers to coil the casing onto the finger; and iv) moving the finger with the casing to a device, such as a device for measuring the diameter thereof, and decoiling the casing to transfer it to the device for measuring the diameter thereof.

In one embodiment, the method comprises the step of applying a receiving structure configured to be inserted into the interior of the casing hereby creating a plurality of spaces between the outside surface of the receiving structure and the inside of the casing, wherein the method comprises the step of applying a plurality of moveably arranged engagement structures configured to be inserted into said spaces, wherein the engagement structures are configured to be moved in order to expand the casing hereby bringing the casing into contact with the engagement structures and removing the contact between the casing and one or more portions of the receiving structure so that the casing can be moved by moving the engagement structures.

In one embodiment, the engagement structures are configured to be moved perpendicular to the length of the receiving structure and hereby expand the casing.

In one embodiment, the engagement structures are configured to be moved along the length of the receiving structure when the casing is attached to the engagement structures. Hereby, it is possible to move the casing away from the receiving structure e.g. to place the casing on another machine structure (e.g. in order to measure the diameter of the casing).

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 15A shows a view of a receiving structure according to the invention;

FIG. 15B shows a view of another receiving structure according to the invention;

DETAILED DESCRIPTION

Figure 1:
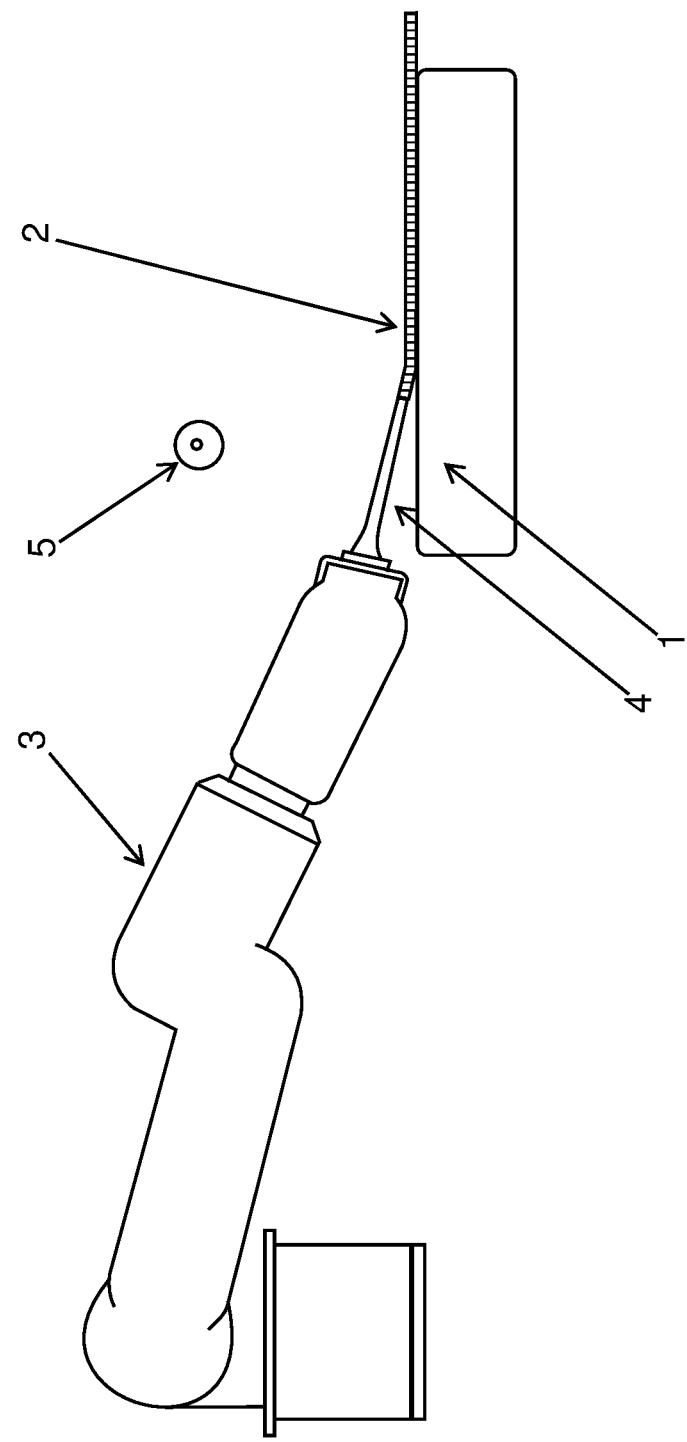
FIG. 1 shows a side view of the system of the present invention.

Referring now in detail to the drawings for the purpose of illustrating preferred embodiments of the present invention, a system 20 of the present invention is illustrated in FIG. 1.

FIG. 1 illustrates a system 20 of the present invention. The system 20 comprises a flexible support 1 having a rough surface for placing the casing 2 to be transported. The system 20 comprises an actuated arm 3 movable in 3D, and equipped with a finger 4 fitting the interior of the casing 2. One or more actuatable rollers (not shown) can be arranged in such a manner that they can be brought into contact with the finger 4 for coiling the casing 2 onto the finger 4 when the finger has engaged with the casing 2. The one or more rollers may be configured to hold a portion of the casing 2 by pressing the rollers against the outer face of a part of the casing 2 mounted on the finger 4 and held between the rollers.

The system 20 comprises a camera 5. In order to detect the position of the casing 2 on the support 1 the camera 5 is used. The camera 5 is in communication with a control unit (not shown) that receives image information (e.g. a video sequence) from the camera 5. The control unit is programmed to direct the finger 4 to the casing 2 when placed on the support 1.

In one embodiment, the control unit is further configured to subsequently move the finger 4 with the casing 2 into a position, in which the casing is in contact with the one or more rollers and activate the one or more rollers to coil the casing 2 onto the finger 4, before moving the finger 4 with the casing 2 e.g. to a device for measuring the diameter thereof, and finally decoiling the casing 2 to transfer it e.g. to a device for measuring the diameter thereof.

Figure 2A:
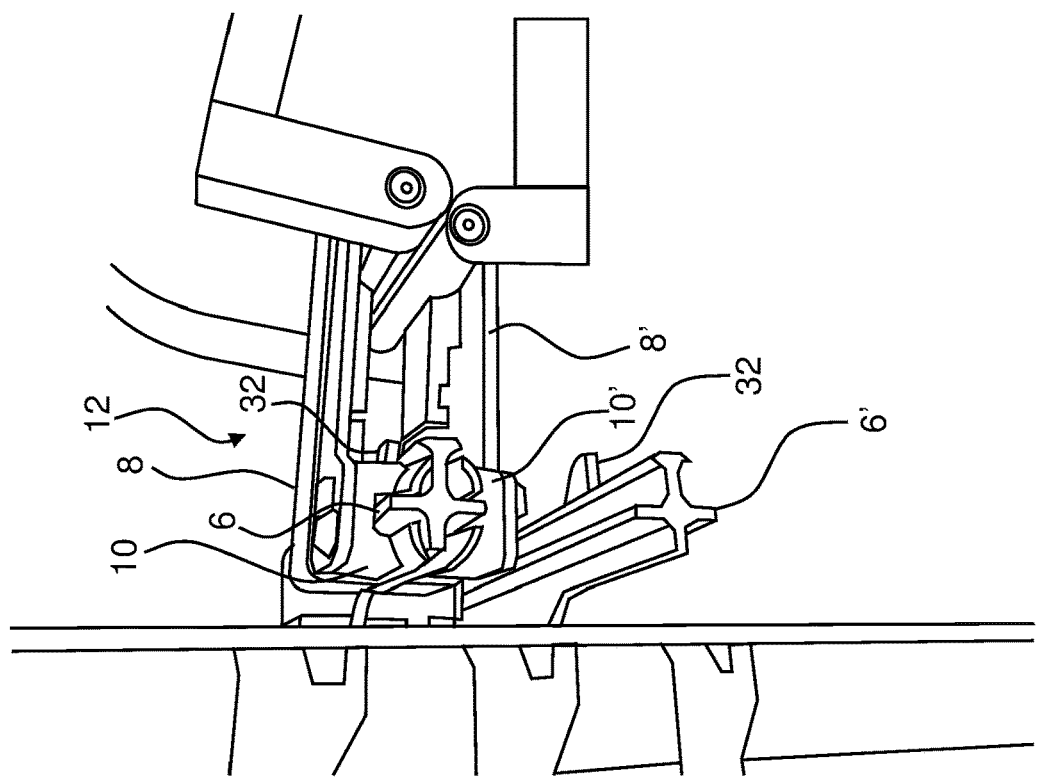
FIG. 2A shows a view of a clamping device of the system according to the invention.

FIG. 2A illustrates a side view of a clamping device 12 of the system according to the invention. The clamping device 12 is configured to be partly inserted into the interior of a casing and partly clamp against the outside of the casing.

The clamping device 12 is configured to collect a casing that has been received by a receiving structure 6. The receiving structure 6 can in one embodiment be detachably attached to a holding device 16. The clamping device 12 comprises a pair of engagement structure 14, 14' arranged and configured be inserted into the interior of a casing that has been received by a receiving structure 6.

The clamping device 12 comprises a pair of intermediate structures 10, 10' arranged and configured to engage with and thus press against the outside of a casing and hereby clamp against the casing 2 when the engagement structure 14, 14' has been inserted into the interior of the casing.

The first intermediate structure 10 is arranged to press against the outside of a casing from a first direction. Likewise, the second intermediate structure 10' is arranged to press against the outside of a casing from a second direction (preferably the opposite direction).

The clamping device 12 comprises a pair of arms 8, 8' rotatably arranged with respect to rotational axes X, X'. The first engagement structure 14 is provided in the distal end of the first arm 8. The second engagement structure 14' is provided in the distal end of the second arm 8'.

The clamping device 12 comprises another pair of arms 9, 9' rotatably arranged with respect to rotational axes X, X'. The first intermediate structure 10 is provided in the distal end of the first arm 9. The second intermediate structure 10' is provided in the distal end of the second arm 9'.

The receiving structures 6, 6' have a cross-shaped cross section. A flange portion is provided at the end of the longest leg (plate) of the receiving structures 6, 6'.

Figure 2B:
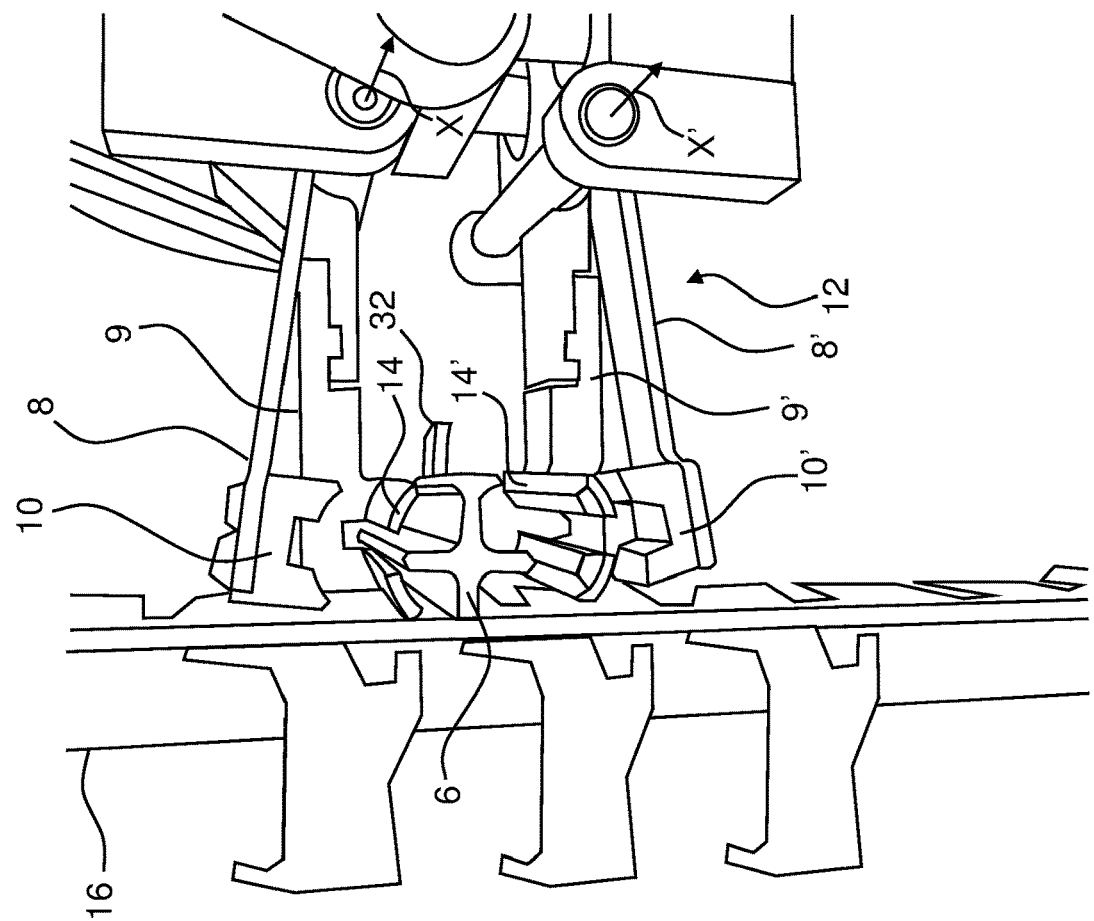
FIG. 2B shows another view of the clamping device shown in FIG. 2A.

FIG. 2B illustrates another view of the clamping device 12 shown in FIG. 2A. The clamping device 12 has been activated and the engagement structures 14, 14' have been brought into engagement with the receiving structure 6. A protruding structure 32 protrudes from a central portion of the receiving structure 6. The protruding structure 32 is configured to stop a casing from being moved further along the length of the receiving structure 6. The protruding structure 32 functions as a mechanical stop element that prevents the casing from being moved further along the length of the receiving structure 6 once the casing is brought into contact with the protruding structure 32.

In FIG. 2B the clamping device 12 is being brought into engagement with the receiving structure 6. Since the casing is held in a position, in which there is space between adjacent plates of the receiving structure 6 (see FIG. 16F for a further explanation), the receiving structure 6 can be inserted into the interior of a casing by sliding the engagement structure 14, 14' along the length of the receiving structure 6. A second receiving structure 6' is placed below the first receiving structure 6. Both the first receiving structure 6 and the second receiving structure 6' are provided with a protruding structure 32 configured to stop a casing from being moved further along the length of the receiving structure 6, 6'.

Figure 3B:
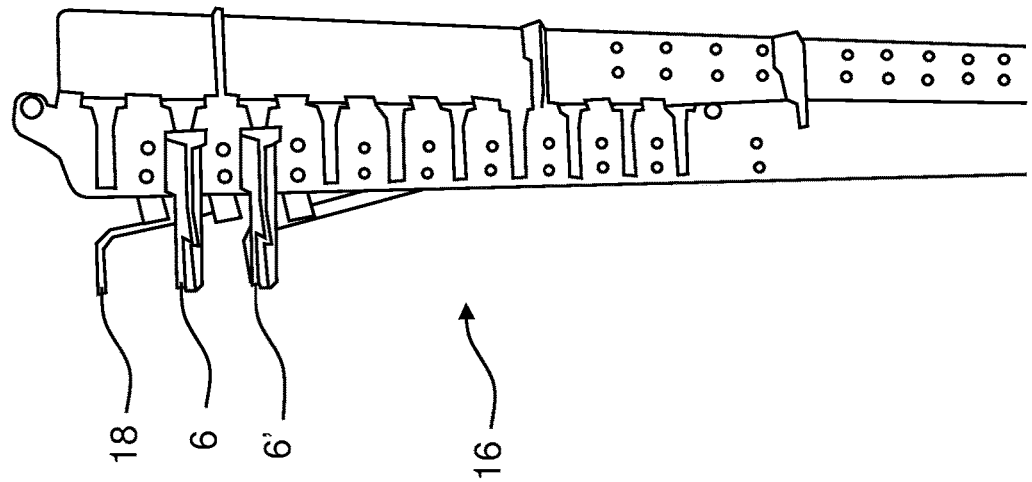
FIG. 3B shows another view of the holding device shown in FIG. 3A.
Figure 3A:
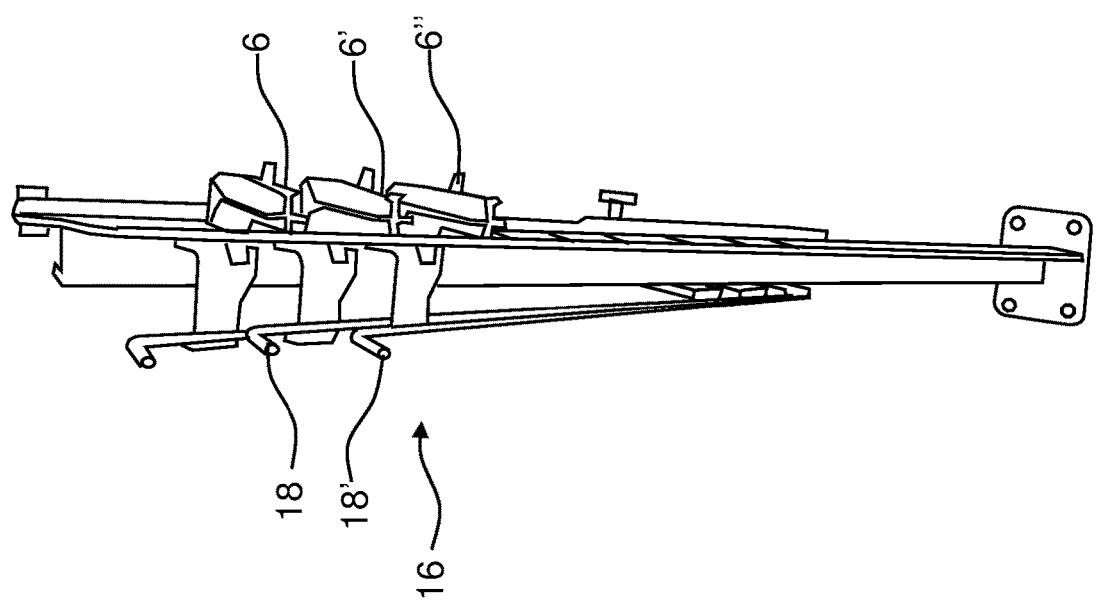
FIG. 3A shows a side view of a holding device of the system according to the invention.

FIG. 3A illustrates a side view of a holding device 16 of the system according to the invention. FIG. 3B illustrates a front view of the holding device shown in FIG. 3A. The holding device 16 comprises an upright body provided with a plurality of recesses configured to receive a receiving structure 6, 6'. Next to each recess, a corresponding L-shaped pull structure 18, 18' is arranged. Each pull structure 18, 18' comprises a sort distal portion that extends basically perpendicular to the remaining proximal portion of the pull structure 18, 18'. The distal portion of each of the pull structures 18, 18' is configured to be partly inserted into an opening of the casing arranged on the receiving structure 6, 6'. Hereby, the pull structures 18, 18' will pull the casing. Accordingly, space is created between a receiving structure 6, 6' and the casing surrounding it. Accordingly, a structure can be inserted into the space between the casing and the receiving structure.

The holding device 16 may be used to receive receiving structures 6, 6' being manually attached to the holding device 16. It is possible to automatically pick up a casing by using a finger and automatically attach the finger or a structure attached thereto to the holding device 16.

Figure 4:
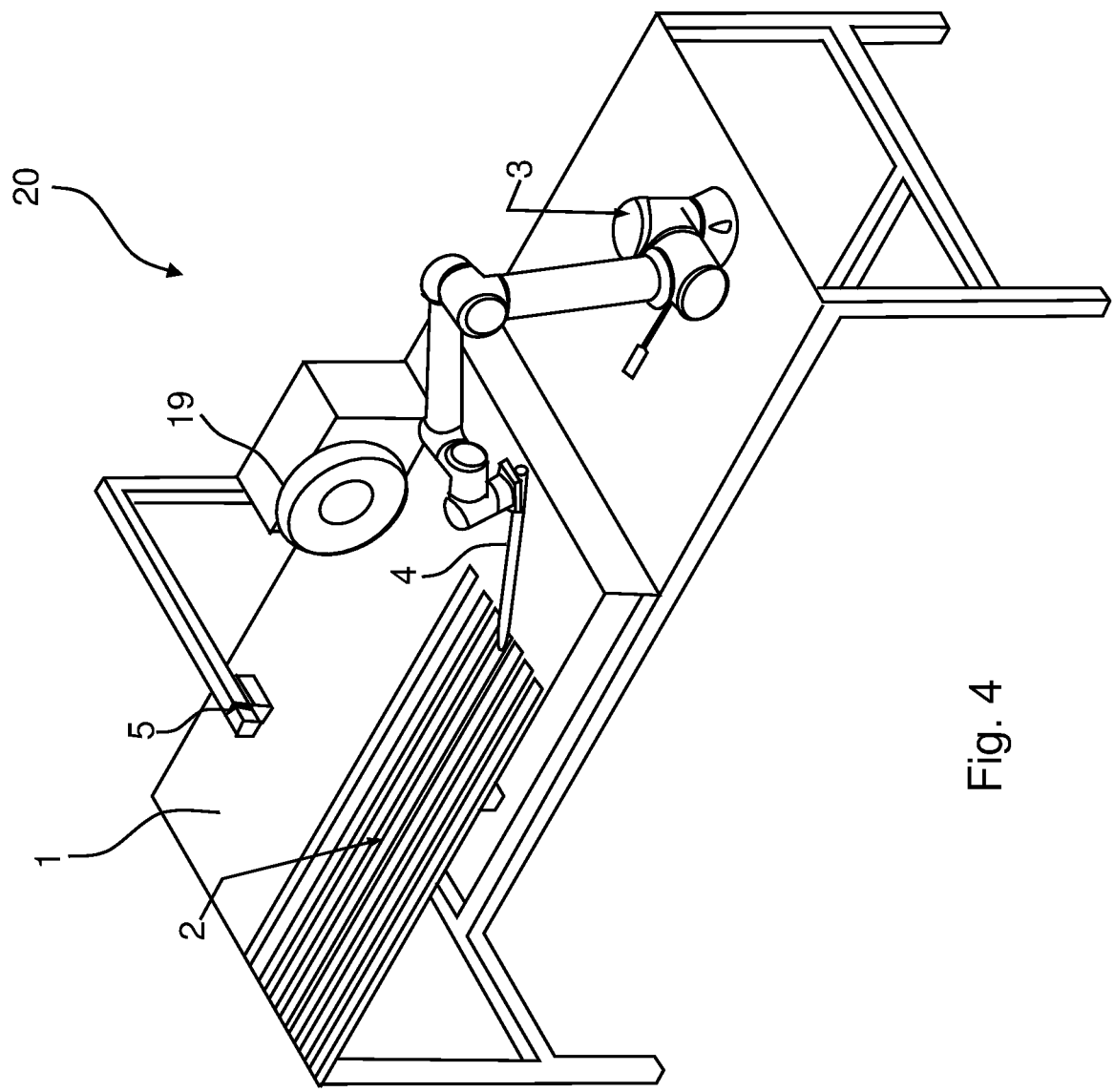
FIG. 4 shows a perspective view of a system according to the invention.

FIG. 4 illustrates a perspective view of a system 20 according to the invention. The system 20 comprises a support 1. The support is arranged on a table, however, it may be arranged differently. A plurality of casings 2 are placed on the top of the support 1. The system 20 comprises a robot arm 3 comprising three segments. The distal segment is provided with a finger 4 protruding therefrom. The finger is configured to be inserted into the interior of a casing 2.

The system comprises a roller 19 provided with a centrally arranged recess extending along the entire periphery of the roller 19. The robot arm 3 is arranged and configured to transport the finger into a position in which the casing attached to the finger can be brought into contact with the roller 19. The system 20 comprises a motor (not shown) configured to drive the roller 19. The system 20 moreover comprises a control unit (not shown) configured to activate the motor and hereby rotate the roller 19.

The system 20 comprises a camera 5 mounted on an arm. The camera is arranged and configured to provide visual information that can be used to control the motion of the robot arm 3 and the finger 4.

The support 1 is flexible and provides a friction sufficient to prevent the lower portion of a casing 2 placed on the support 1 and being in contact with the support 1 from moving when the finger 4 presses against the topside of the casing 4 and is moved along the length of the casing. In order to make this happen, it may be an advantage to ensure that the angle between the finger 4 and the support is smaller than a predefined level. In one embodiment, the angle between the finger 4 and the support is smaller than 30 degrees. In one embodiment, the angle between the finger 4 and the support is smaller than 20 degrees. In one embodiment, the angle between the finger 4 and the support is smaller than 15 degrees. In one embodiment, the angle between the finger 4 and the support is equal to or smaller than 10 degrees.

Figure 5:
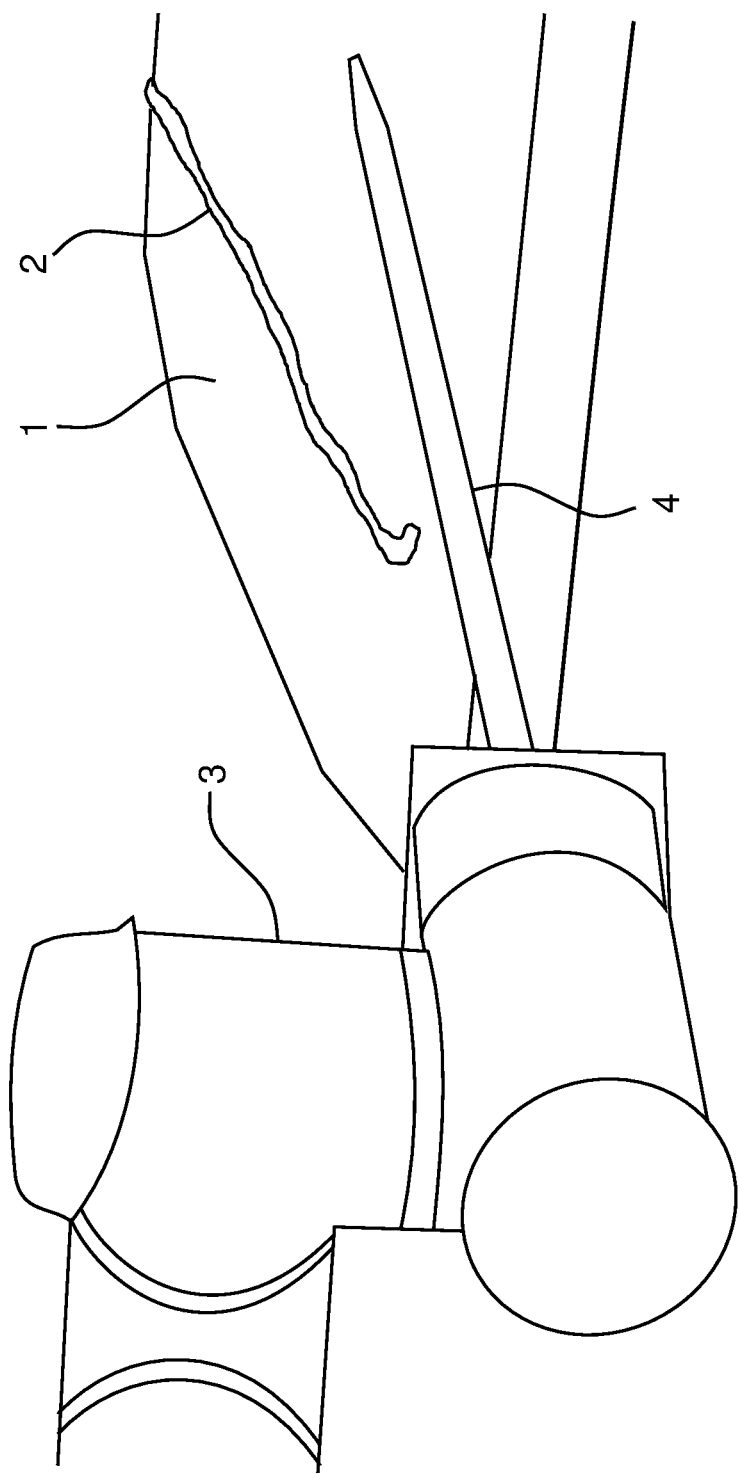
FIG. 5 shows a view of a system according to the invention in a first configuration.

FIG. 5 illustrates a view of a system according to the invention in a first configuration. The system comprises a robot arm 3 and a finger 4 attached to the distal portion of the robot arm 3.

The finger is configured to pick up a casing 2 placed on a flexible support 1. The finger is shaped as an elongated rod having a conical and rounded distal end. Accordingly, the finger 4 will not damage the casing 2 upon picking-up the casing 2. In FIG. 5 the finger is not in contact with the casing 2 yet.

Figure 6:
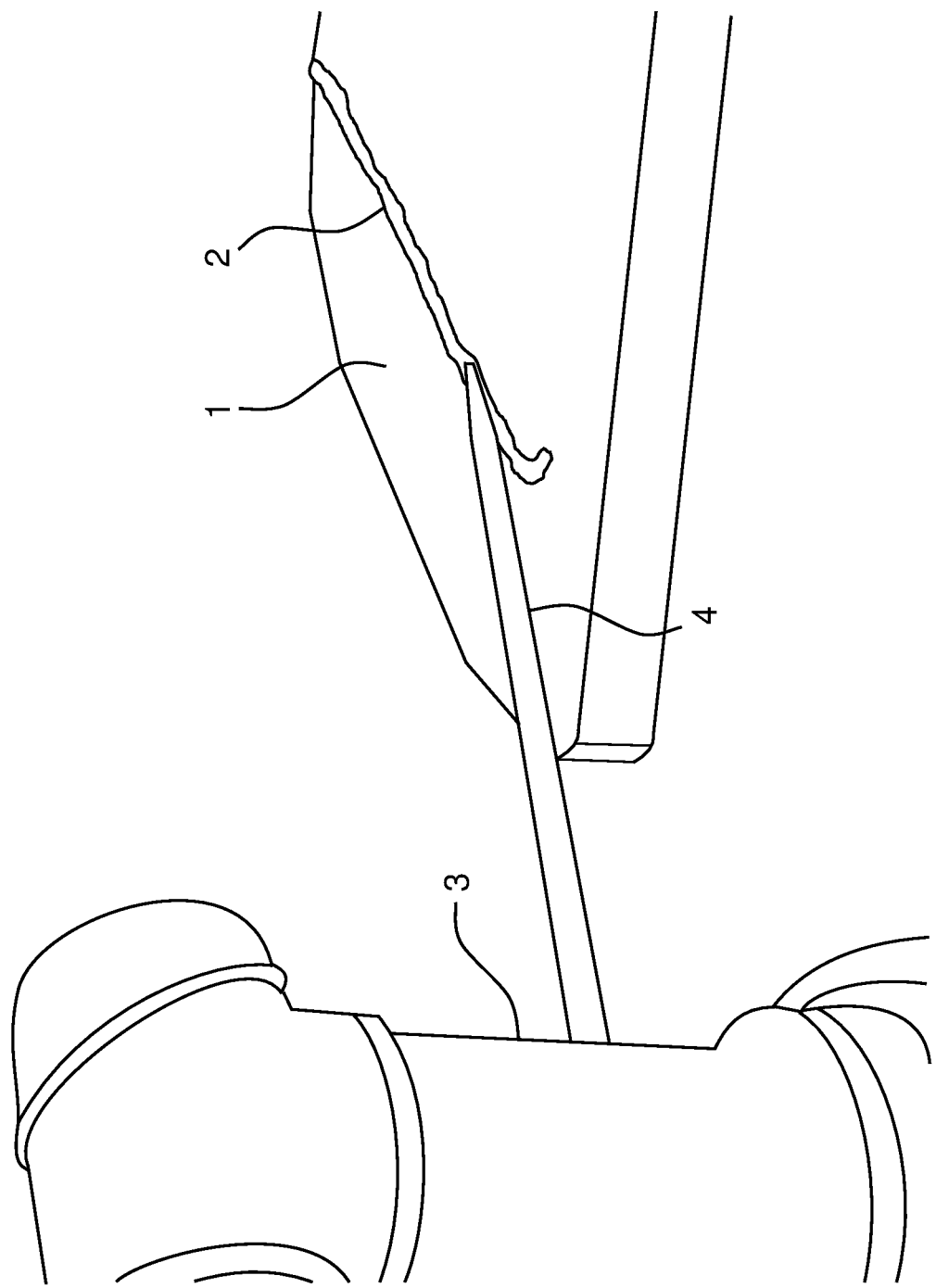
FIG. 6 shows a view of the system shown in FIG. 5 in a second configuration.

FIG. 6 illustrates a view of the system shown in FIG. 5 in a second configuration, in which the finger 4 has been moved into a position in which the finger 4 is in contact with the casing 2.

Figure 7:
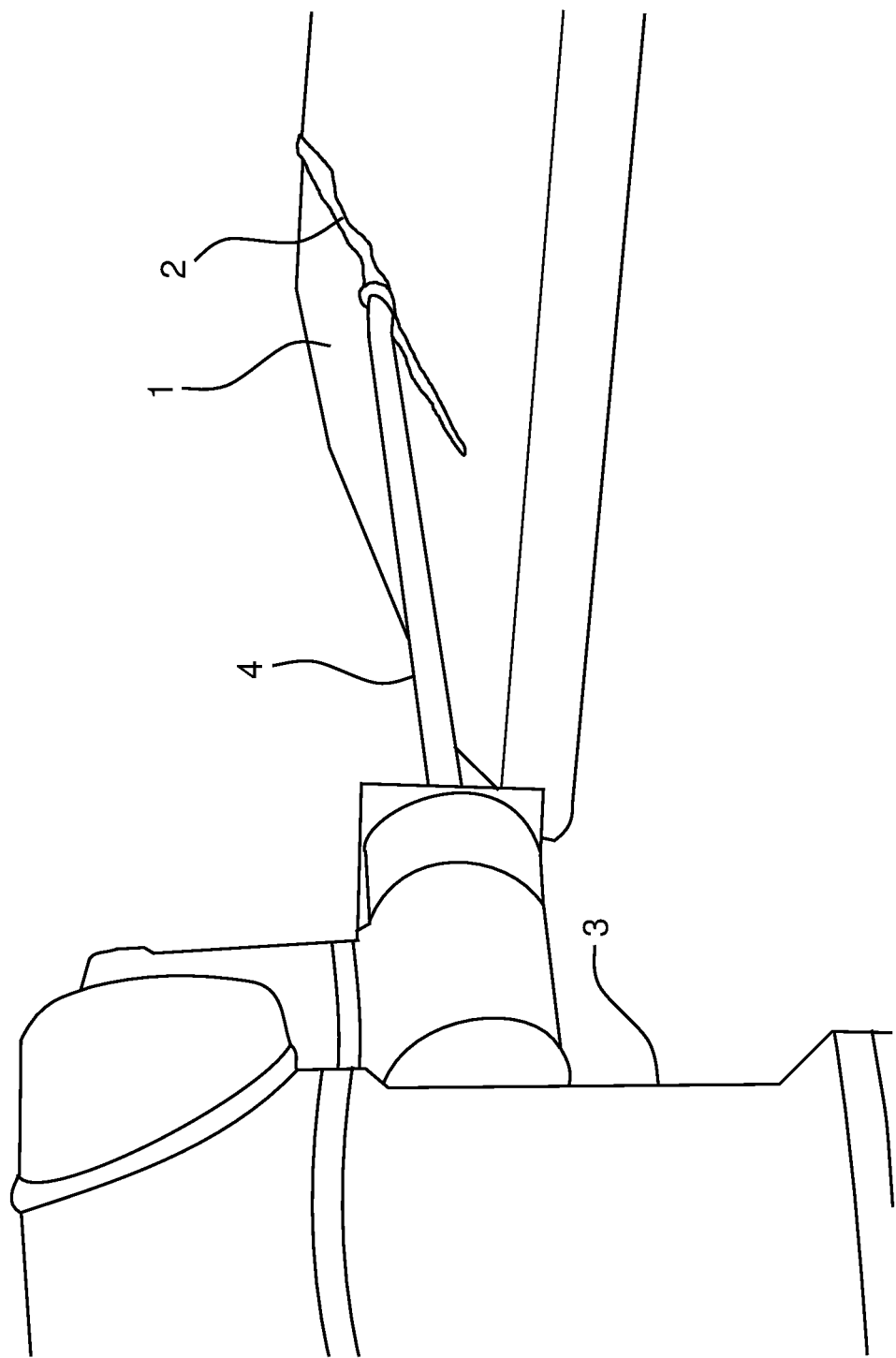
FIG. 7 shows a view of the system shown in FIG. 5 in a third configuration.

FIG. 7 illustrates a view of the system shown in FIG. 5 in a third configuration, in which the finger 4 has been moved along the length of the casing 2. It can be seen that the casing 2 surrounds the distal portion of the finger 4.

Figure 8:
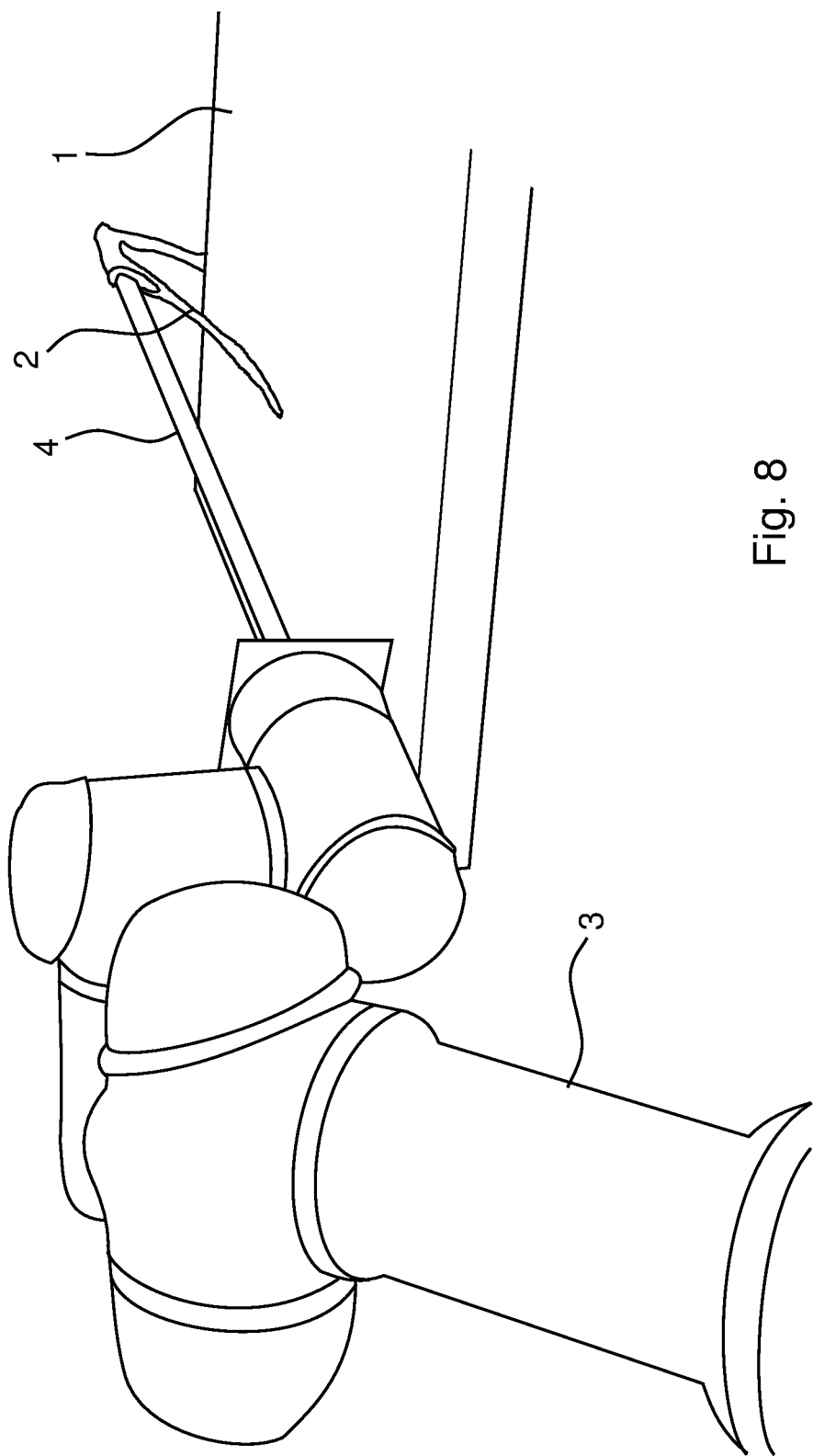
FIG. 8 shows a view of the system shown in FIG. 5 in a fourth configuration.

FIG. 8 illustrates a view of the system shown in FIG. 5 in a fourth configuration, in which the finger has picked-up the casing 2 and is being lifted in order to transport the casing to a second position.

Figure 9:
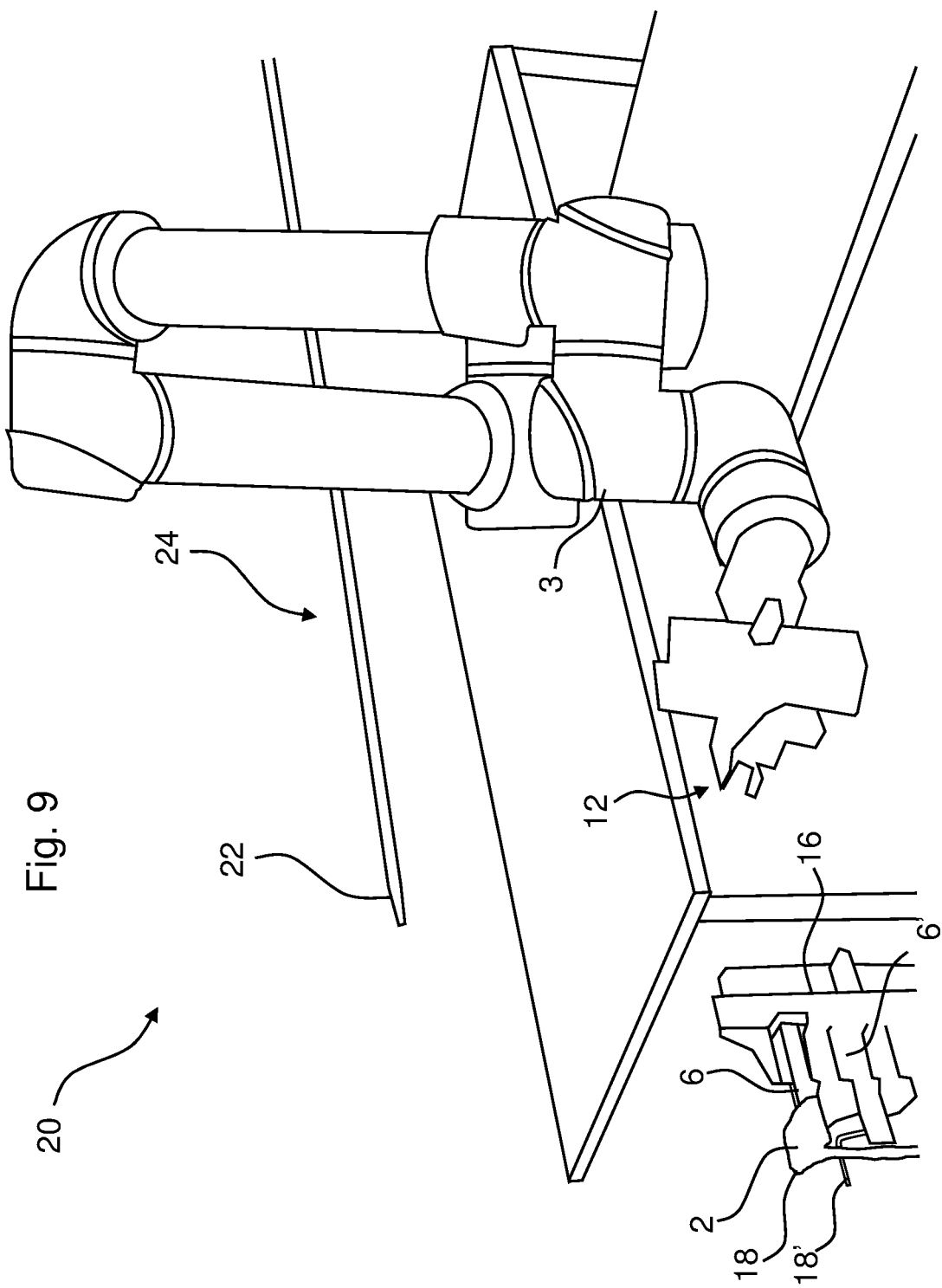
FIG. 9 shows a view of a system according to the invention in a first configuration.

FIG. 9 illustrates a view of a system 20 according to the invention in a first configuration. The system 20 comprises a robot arm 3 provided with a finger 4 as explained with reference to FIG. 1, FIG. 4 and FIG. 5.

The system 20 also comprises a clamping device 12 like the one explained with reference to FIG. 2A and FIG. 2B. The system 20 furthermore comprises a holding device 16 such as the one explained with reference to FIG. 2A, FIG. 2B, FIG. 3A and FIG. 3B. A casing 2 is arranged on a receiving structure 6 that is attached to the holding device 16. The casing 2 is pulled by a pull structure 18. Accordingly, the gripping device 12 is capable of inserting a structure into the interior of the casing 2 and further expanding the casing 2 and hereafter moving it from the receiving structure 6.

The system 20 comprises a device 24 configured to measure the diameter of casings 2. This device 24 comprises a receiving structure 22. In one embodiment, the receiving structure 22 is shaped as a pipe.

Figure 10:
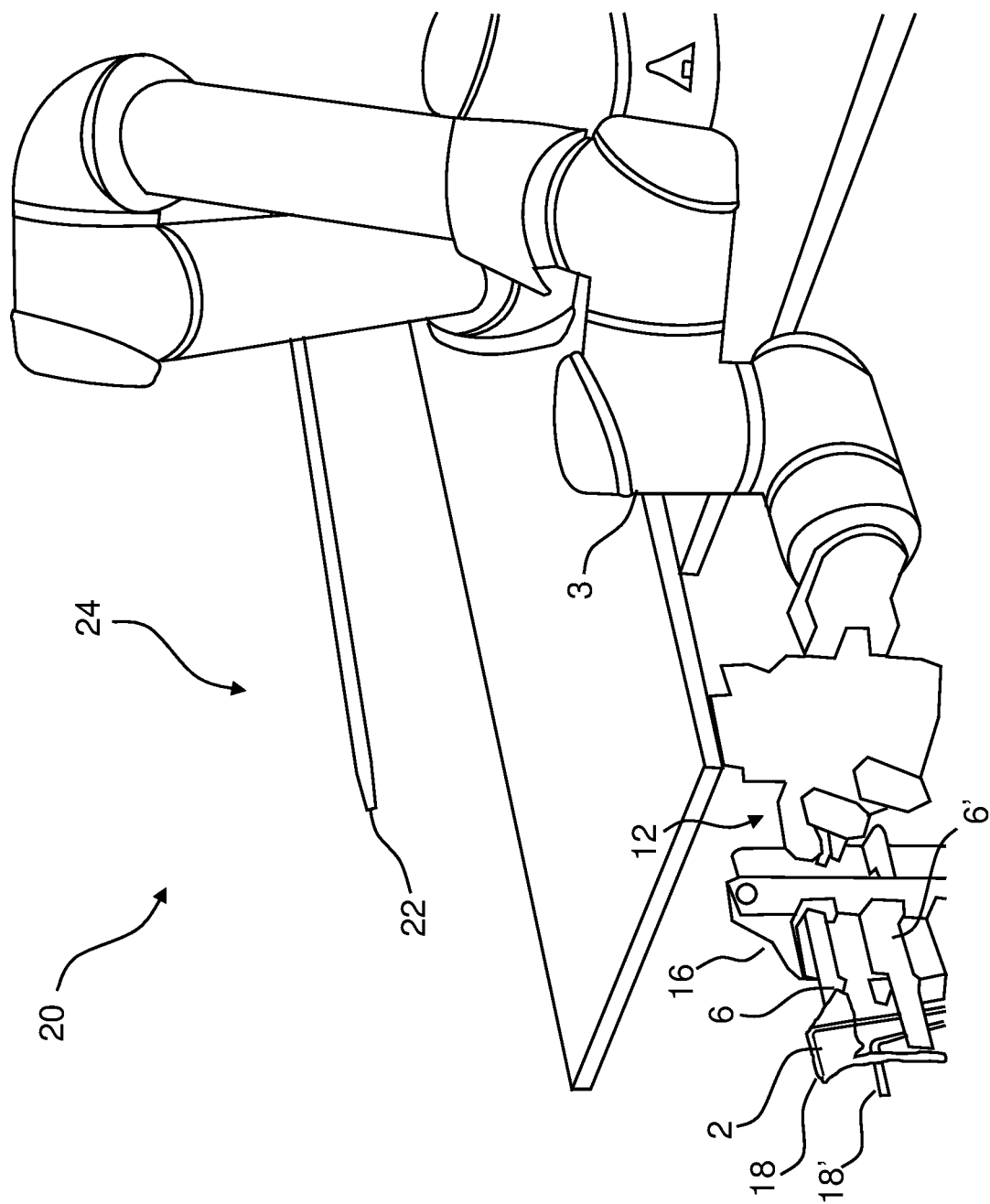
FIG. 10 shows a view of the system shown in FIG. 9 in a second configuration.

FIG. 10 illustrates a view of the system 20 shown in FIG. 9 in a second configuration, in which the robot arm 3 has moved the gripping device 12 closer to the casing 2.

Figure 11:
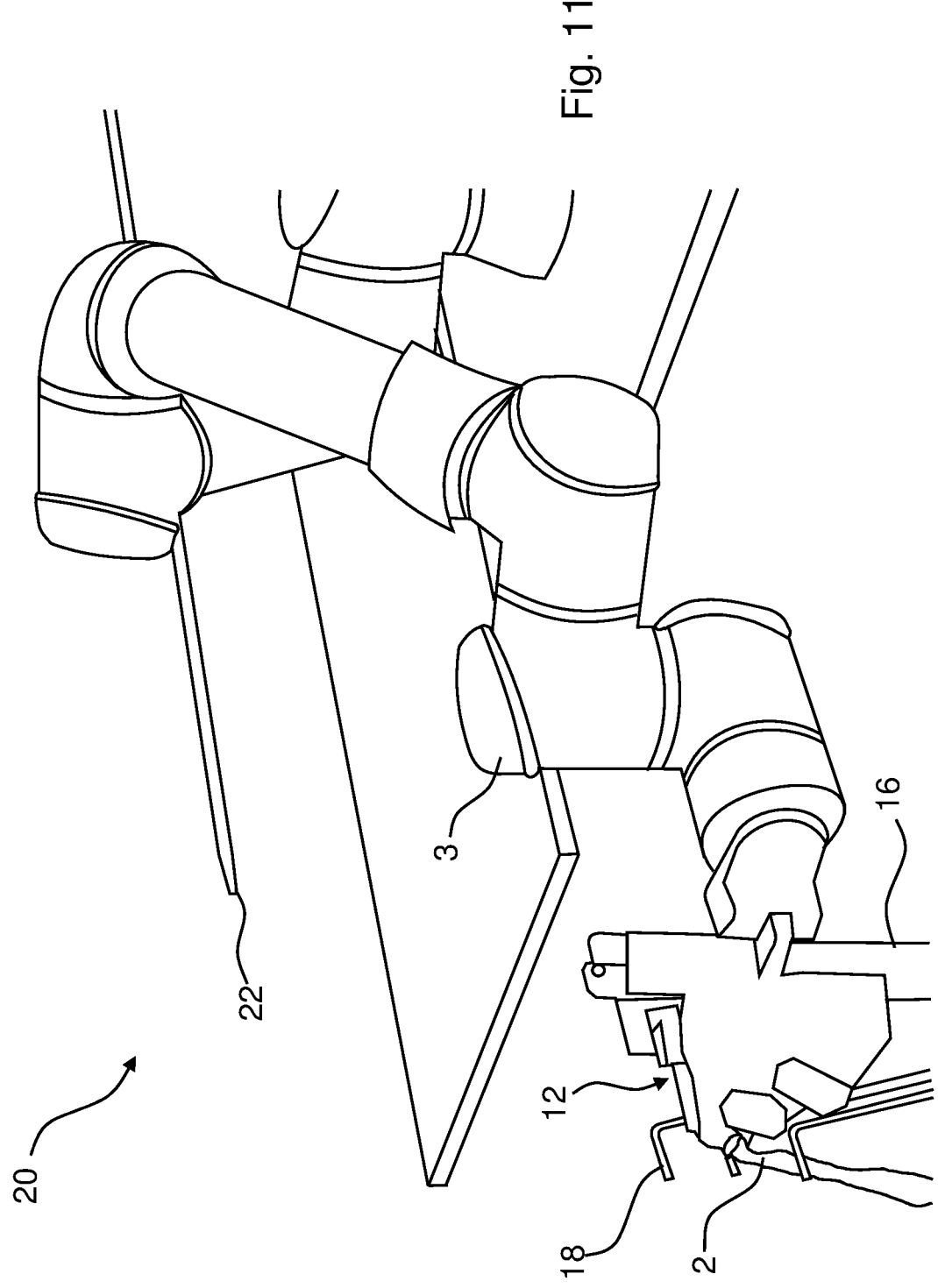
FIG. 11 shows a view of the system shown in FIG. 9 in a third configuration.

FIG. 11 illustrates a view of the system 20 shown in FIG. 9 in a third configuration, in which the gripping device 12 has inserted a structure into the interior of the casing 2 and has expanded the casing 2.

Figure 12:
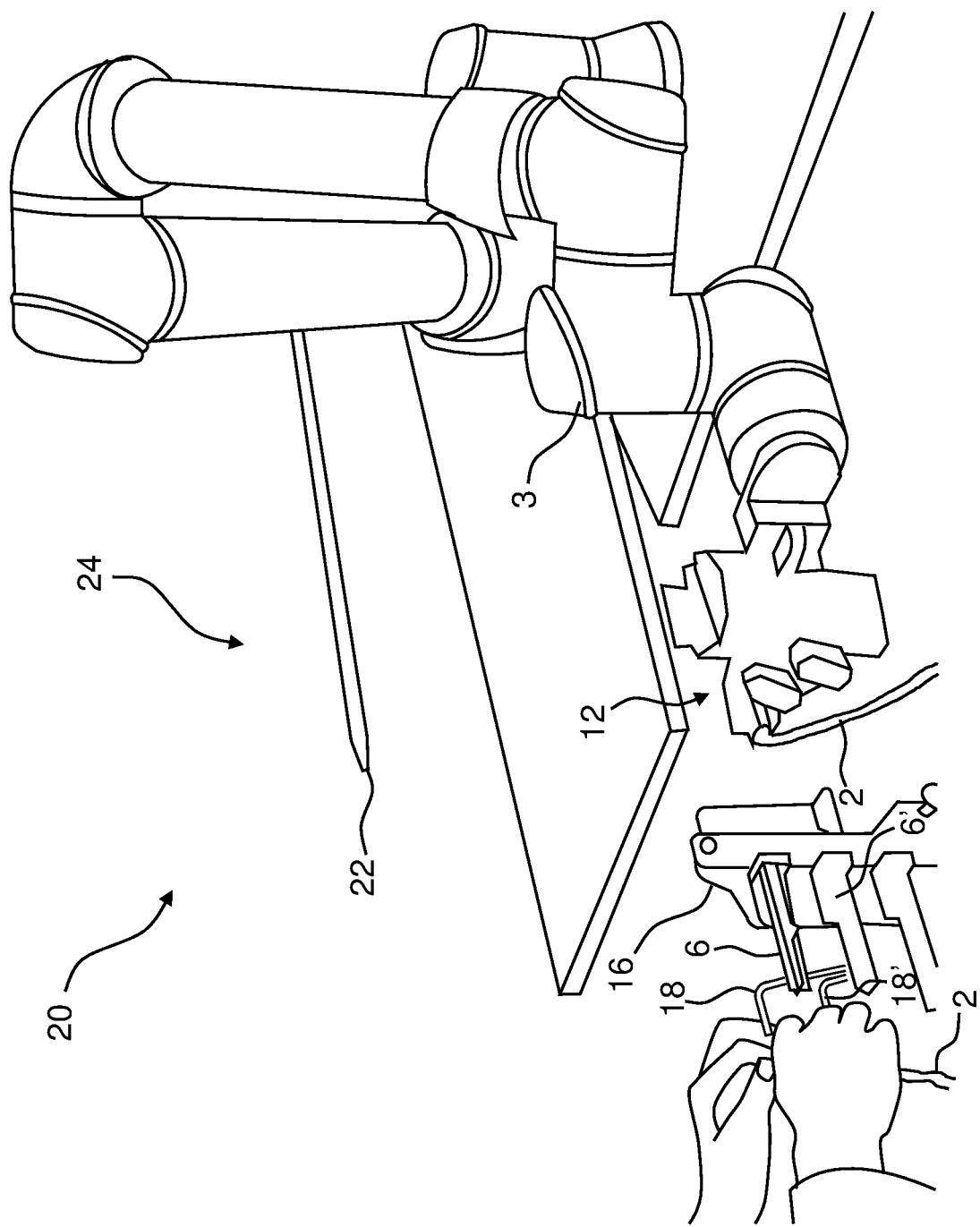
FIG. 12 shows a view of the system shown in FIG. 9 in a fourth configuration.

FIG. 12 illustrates a view of the system 20 shown in FIG. 9 in a fourth configuration, in which the clamping device 12 has taken the casing 2 from the receiving structure 6. Now the clamping device 12 has already moved the casing 2 in a path towards the receiving structure 22 to attach the casing 2 thereto.

Figure 13:
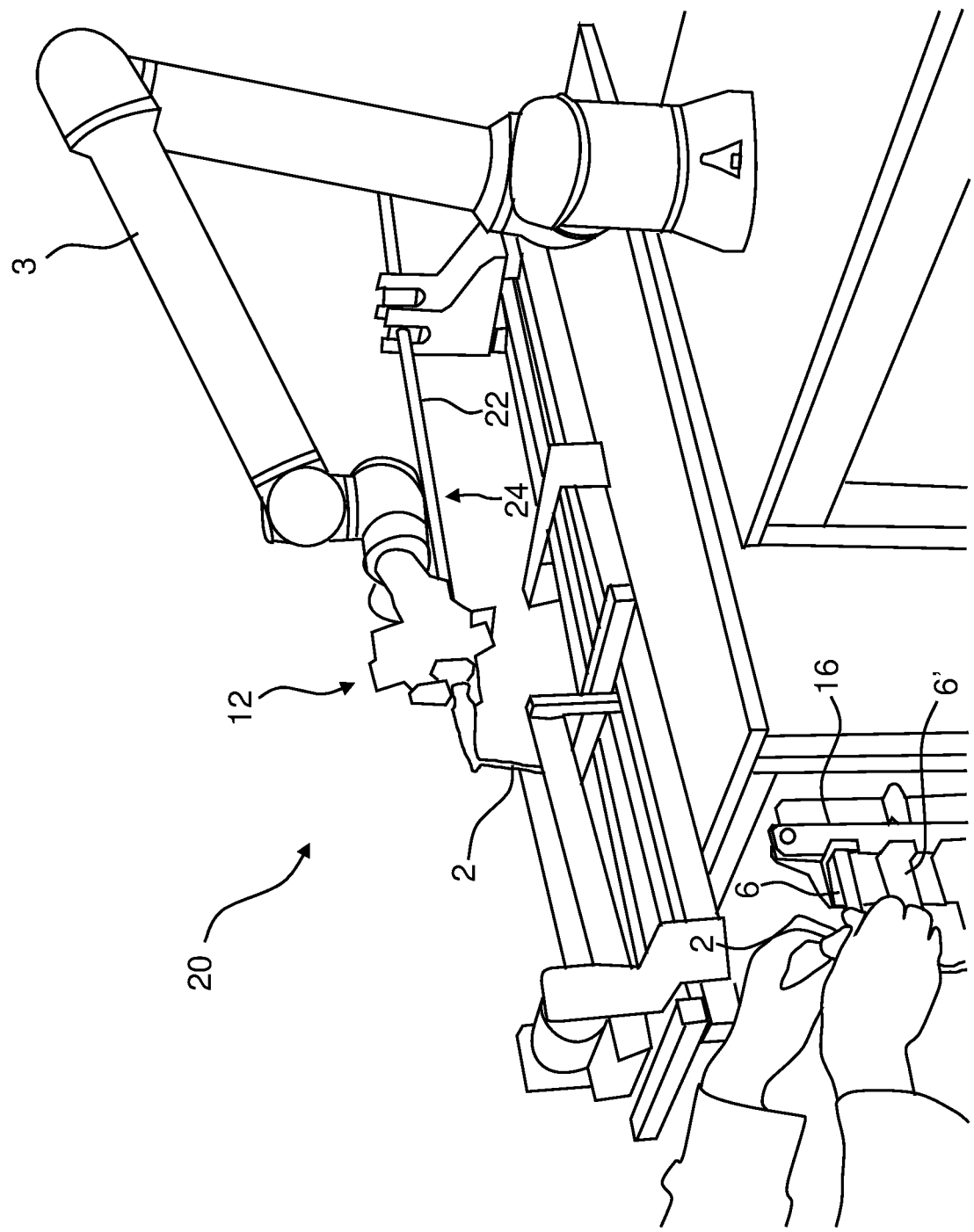
FIG. 13 shows a view of the system shown in FIG. 9 in a fifth configuration.

FIG. 13 illustrates a view of the system 20 shown in FIG. 9 in a fifth configuration, in which the casing 2 has been attached to the distal portion of the receiving structure 22. Another casing 2 is being manually attached to the distal portion of the receiving structure 6.

Figure 14A:
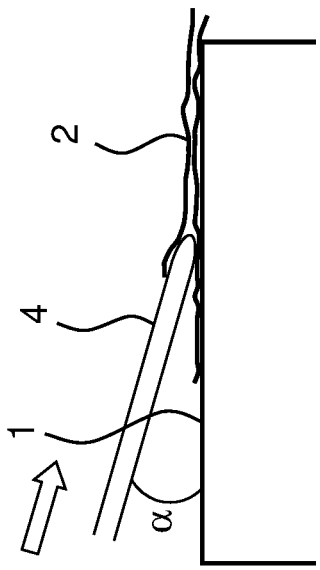
FIG. 14A shows a view of a system according to the invention in a first configuration.

FIG. 14A illustrates a view of a system according to the invention in a first configuration, in which a finger 4 of the system is placed on the top of a casing 2 arranged on the top of a support 1. The finger 4 is being moved along the length of the casing 2. The angle α between the support 1 and the finger 4 is indicated. The angle α may be in the range 5-20 degrees. In one embodiment, the angle α is in the range 6-15 degrees. Even though not indicated, it may be an advantage to press the finger downwards in order to increase the normal force and thus the friction between the underside of the casing 2 and the support 1.

Figure 14B:
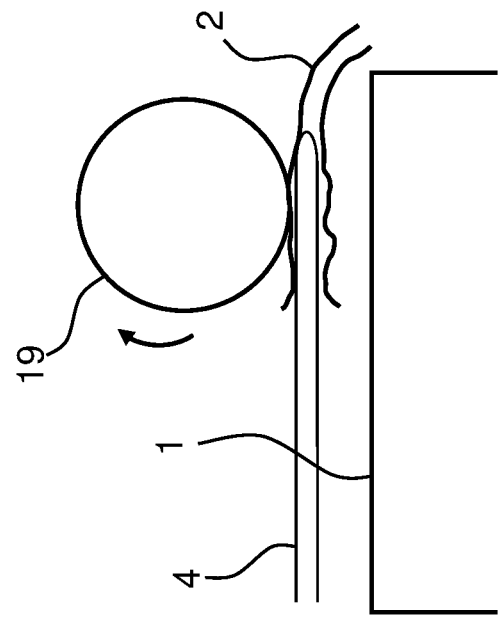
FIG. 14B shows a view of a system shown in FIG. 14A in a second configuration.

FIG. 14B illustrates a view of the system shown in FIG. 14A in a second configuration, in which the finger 4 has been moved along the casing 2. It can be seen that the finger 4 now has access to and thus enters the interior of the casing 2.

Figure 14C:
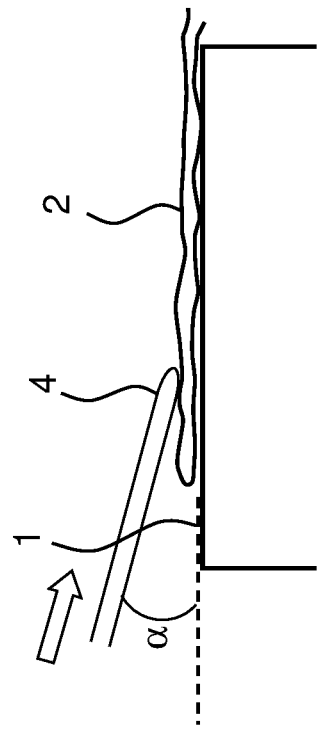
FIG. 14C shows a view of a system shown in FIG. 14A in a third configuration.

FIG. 14C illustrates a view of the system shown in FIG. 14A in a third configuration, in which the finger 4 is no longer pressing the casing 2 towards the support 1. The finger has been raised and angled in such a manner that the finger basically extends parallel to the upper surface of the support 1 and is distanced therefrom. It can be seen that the distal portion of the casing 2 has been picked-up by the finger 4.

Figure 14D:
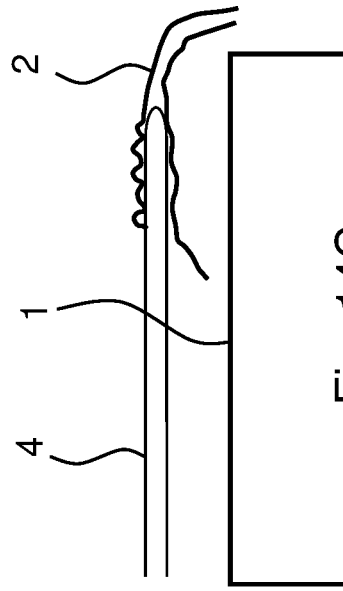
FIG. 14D shows a view of a system shown in FIG. 14A in a fourth configuration.

FIG. 14D illustrates a view of the system shown in FIG. 14A in a fourth configuration, in which the finger 4 and the casing 2 attached thereto engage a rotating roller 19. It can be seen that a clockwise rotation of the roller 19 will coil the casing 2 up on the finger 4.

FIG. 15A illustrates a view of a receiving structure 6 corresponding to the one shown in FIG. 2A, FIG. 2B, FIG. 3A, FIG. 3B and FIG. 9-13. The receiving structure 6 comprises three first plates 26 and a second longer plate 28 fixed to each other to form a body having a cross-shaped cross section. A flange 30 is attached to the distal portion of the long plate 28.

FIG. 15B illustrates a view of another receiving structure 6 according to the invention. The receiving structure 6 has a proximal portion shaped as the receiving structure 6 shown in FIG. 16A. The distal portion of the receiving structure 6, however, is shaped as a finger 4 as the one explained previously with reference to FIG. 1, FIG. 4-8, FIG. 14A, FIG. 14B, FIG. 14C and FIG. 14D.

Figure 16A:
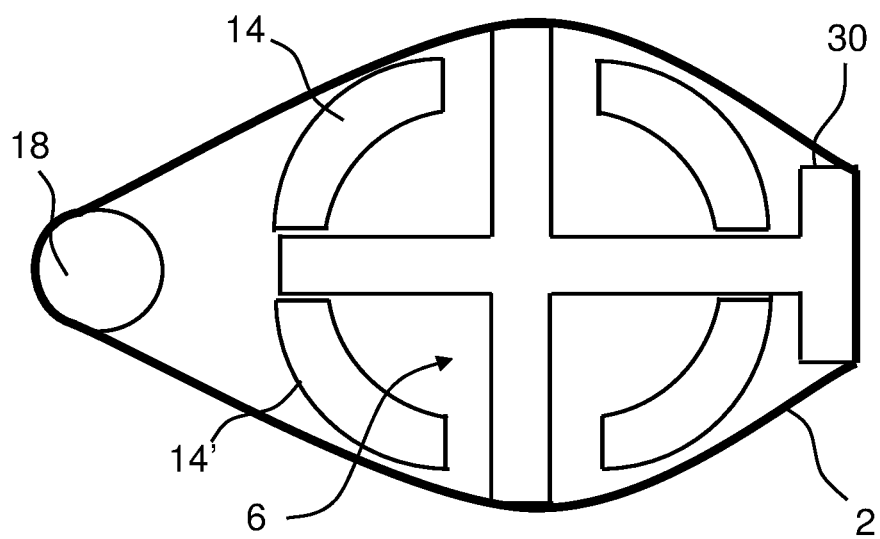
FIG. 16A shows a casing received by a receiving structure.

FIG. 16A illustrates a casing 2 that has been received by a receiving structure 6 like the one illustrated in FIG. 15A. The casing 2 is being pulled by a pull structure 18 and thus sufficient space for entering engagement structures 14, 14' into the room between the casing 2 and the receiving structure is established. It can be seen the receiving structure 6 comprises a flange 30. The casing 2 is in contact with the pull structure 18 and the receiving structure 6.

Figure 16B:
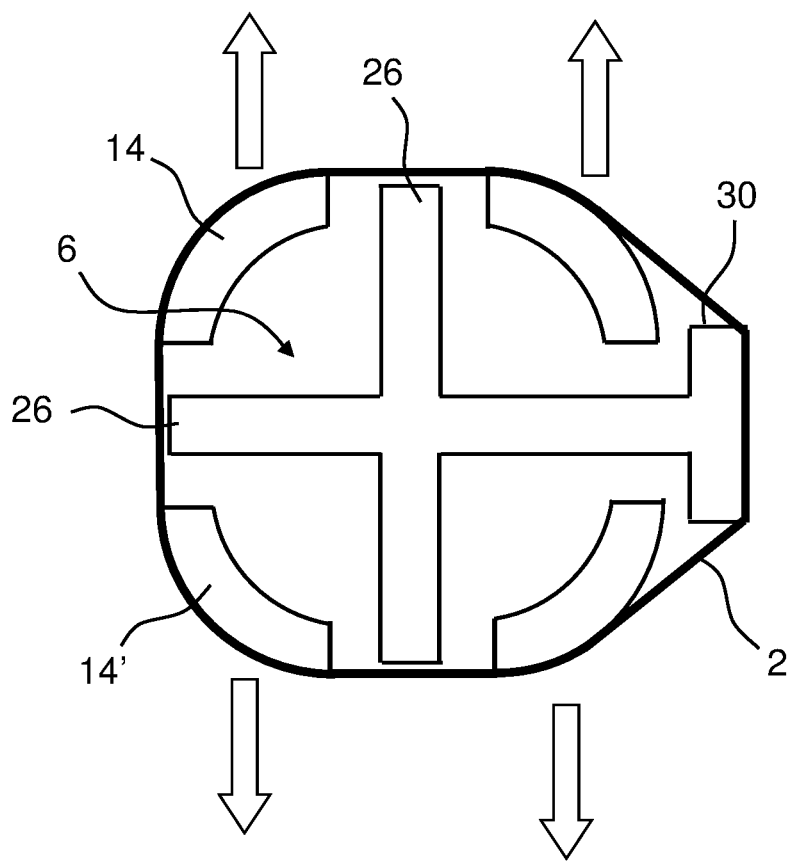
FIG. 16B shows that the engagement structures can expand the casing.

FIG. 16B illustrates that the engagement structures 14, 14' expand the casing 2 when being displaced upwards and downwards, respectively (as indicated with the arrows). Therefore, the casing 2 is no longer in contact with the plates 26, 28 of the receiving structure 6. Moreover, the casing 2 is no longer in contact with the pull structure 18.

Accordingly, the casing 2 can now be moved by sliding the engagement structures 14, 14' being in contact with the inside portion of the casing 2 along the length of the receiving structure 6.

It may be an advantage, that intermediate structures (like the one illustrated in FIG. 2A and FIG. 2B) are arranged in a position, in which they can be used to clamp against the outside surface of the casing 2. Hereby, transportation of the casing 2 can be controlled because the casing 2 is both clamped from the inside (by means of the engagement structures 14, 14') and from the outside by the intermediate structures.

LIST OF REFERENCE NUMERALS

1 Support
2 Casing
3 Actuated arm
4 Finger
5 Camera
6, 6', 6" Receiving structure
8, 8' Arm
9, 9' Arm
10, 10' Intermediate structure
12 Clamping device
14, 14' Engagement structure
16 Holding device
18, 18' Pull structure
19 Roller
20 System
22 Receiving structure
24 Device
26 Plate
28 Plate
30 Flange
32 Protruding structure
X, X' Axis of rotation

What is claimed is:

1. A system for use in picking up and transporting a casing of indefinite length into relationship with a device, said system comprising:
    a support upon which a casing to be picked up is placed;
    a camera for detecting the casing placed on the support;
    an actuated arm equipped with a finger fitting the interior of the casing; and a control unit receiving image information from the camera, wherein the control unit is configured to direct the finger to the casing placed on the support, and subsequently to move the finger with the casing to a device, and finally to decoil the casing to transfer the casing to the device.

2. The system of claim 1, further comprising:
one or more actuatable rollers configured to be brought into engagement with the finger for coiling the casing onto the finger when the finger has engaged with the casing, wherein the control unit is configured to activate the one or more rollers to coil the casing onto the finger.

3. The system of claim 2, wherein the one or more rollers are conical.

4. The system of claim 2, wherein the one or more rollers are mounted on the actuated arm so as to be movable onto the outer surface of the casing when the finger has engaged with the casing.

5. The system of claim 4, wherein the one or more rollers are conical.

6. The system of claim 1, wherein the support has a surface configured to prevent the casing from sliding away from the support when the finger interacts with the casing, wherein the support is made from a flexible material having a rough surface, preventing the casing from sliding away from the finger, and allowing the finger to move in between the two layers of the casing laying on the support.

7. The system of claim 1, wherein the support is coated with a fabric.

8. The system of claim 1, wherein the support is dark so as to provide optimal background contrast relative to the casing.

9. The system of claim 1, wherein the support is made from or covered with a light reflecting material.

10. The system of claim 1, wherein the system comprises an infrared irradiating device configured to illuminate the support.

11. The system of claim 1, wherein the system comprises several intermediate structures arranged in a position in which the intermediate structures can be used to clamp against the outside surface of a casing received by a receiving structure.

12. The system of claim 1, further comprising a receiving structure configured to be inserted into the interior of the casing to create a plurality of spaces between the outside surface of the receiving structure and the inside of the casing.

13. The system of claim 12, further comprising a plurality of moveably arranged engagement structures configured to be inserted into said spaces and moved in order to expand the casing thereby bringing the casing into contact with the engagement structures and removing the contact between the casing and one or more portions of the receiving structure so that the casing can be moved by moving the engagement structures.

14. A method for picking and transporting a casing of indefinite length into relationship with a device, the method comprising the steps of:
placing the casing on a flexible support with a rough surface;
directing an actuated arm equipped with a finger fitting an interior of the casing towards the casing, whereby the finger engages with the casing; and
moving the finger with the casing to a device.

15. The method of claim 14, further comprising the step of activating one or more actuated rollers to coil the casing onto the finger.

16. The method of claim 15, wherein the one or more rollers are provided in a separate device.

17. The method of claim 15, wherein the one or more rollers are mounted on the actuator so as to be movable onto the outer surface of the casing when the finger has engaged with the casing, wherein the one or more rollers when activated are configured to ensure that the entire casing is coiled onto the finger.

18. The method of claim 14, wherein the method comprises the step of applying a receiving structure configured to be inserted into the interior of the casing to create a plurality of spaces between the outside surface of the receiving structure and the inside of the casing.

19. The method of claim 18, wherein the method comprises the step of applying a plurality of moveably arranged engagement structures configured to be inserted into said spaces.

20. The method of claim 19, wherein the engagement structures are configured to be moved in order to expand the casing thereby bringing the casing into contact with the engagement structures and removing the contact between the casing and one or more portions of the receiving structure so that the casing can be moved by moving the engagement structures.

* * * * *